United States Patent [19]
Nakajima et al.

[11] Patent Number: 6,154,974
[45] Date of Patent: Dec. 5, 2000

[54] PHOTOSENSOR SCALE

[75] Inventors: Toshihiro Nakajima, Kashiwa; Saburo Komatsu, Okaya, both of Japan

[73] Assignee: Meltec Corporation, Kashiwa, Japan

[21] Appl. No.: 09/152,676

[22] Filed: Sep. 14, 1998

[30] Foreign Application Priority Data

Dec. 25, 1997 [JP] Japan ................................. 9-367356

[51] Int. Cl.$^7$ ................................................ A45B 3/08
[52] U.S. Cl. ............................................................ 33/707
[58] Field of Search ........................... 33/707; 356/375; 250/327 G

[56] References Cited

U.S. PATENT DOCUMENTS 4,286,871 9/1981 Erickson ........................ 250/237 G
5,576,537 11/1996 Holzapfel et al. ..................... 33/707
5,880,882 3/1999 Michel et al. ..................... 250/237 G

FOREIGN PATENT DOCUMENTS 2094974 9/1982 United Kingdom ................. 33/707

*Primary Examiner*—G. Bradley Bennett
*Attorney, Agent, or Firm*—Oliff & Berridge, PLC

[57] ABSTRACT

An inexpensive and highly-accurate photosensor scale to be disposed in opposition to a reflex-type photosensor for detecting a position of a mobile body moving within a predetermined region, comprising: a base film composed of an industrial photographic film; a slit pattern formed on a surface of said base film; and a reflecting film formed on said slit pattern.

4 Claims, 8 Drawing Sheets

Fig. 9
(a) 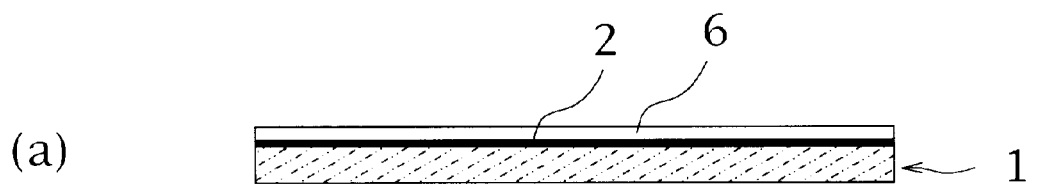
(b) 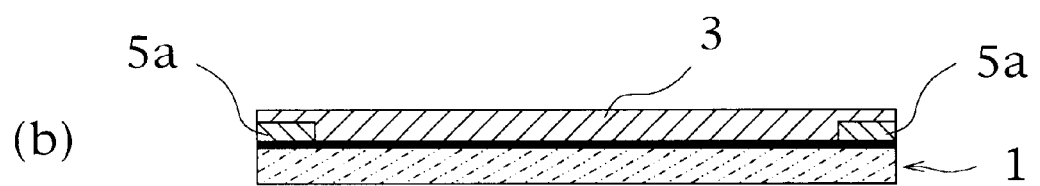
(c) 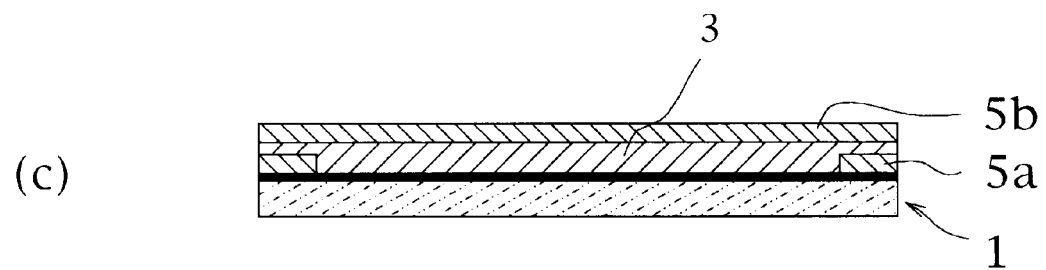

PHOTOSENSOR SCALE

BACKGROUND OF THE INVENTION

1. Field of the Invention

The present invention relates to a manufacturing method of a scale for a photosensor for detecting a position of a mobile body moving within a predetermined region.

2. Description of the Related Art

Printers have been known as peripheral equipments of computers. In such a printer, it is required to actuate a printing head in a predetermined position at the time of printing so as to form characters or graphic patterns with dots. In some types of printers, therefore, a position sensor is provided for sensing a position of a printing head while the printing head is moving.

As such a position sensor, conventionally, a transmission-type photosensor has been mainly used. For example, as shown in FIG. 11, such a transmission-type photosensor 12 is provided with a light-emitting element and a light-receiving element which are disposed in opposition to each other. The photosensor 12 is attached to a carriage 11 of a printing head 10, and a photosensor scale 13 fixed to a printer body is provided so as to pass through between the light-emitting element and the light-receiving element of the photosensor 12. In the scale 13, a number of slits are formed to constitute graduations of a scale at very small intervals in a belt-like metal plate. Light which has been emitted from the light-emitting element of the photosensor 12 and which has passed through a slit of the scale 13 is received by the light-receiving element, and the graduation indicated by the slit of the scale 13 is read. In such a manner, for example, in an ink printer, a printing head reaches a predetermined position corresponding to a graduation slit located at a predetermined number from a base line of the scale is detected so that ink is injected from the printer head.

However, the transmission-type sensor per se is constituted by a pair of light-emitting and light-receiving elements, and high accuracy is required for forming slits at very small intervals in a scale. Therefore, the transmission-type sensor is very expensive.

In addition, recently, demand for high-precision and high-density printing has become stronger. Accordingly, the intervals of the slits are required to be smaller and more accurate. It has become difficult for a conventional scale to satisfy such requirements.

SUMMARY OF THE INVENTION

It is therefore an object of the present invention to solve the foregoing problems to thereby provide an inexpensive and highly-accurate photosensor scale for use in a reflex-type photosensor.

In order to achieve the above object, according to an aspect of the present invention, provided is a photosensor scale to be disposed in opposition to a reflex-type photosensor for detecting a position of a mobile body moving within a predetermined region, comprising: a base film composed of an industrial photographic film; a slit pattern formed on a surface of the base film; and a reflecting film formed on the slit pattern.

In the above photosensor scale, preferably, the reflecting film is covered with an anti-oxidizing protective layer.

According to another aspect of the present invention, provided is a photosensor scale to be disposed in opposition to a reflex-type photosensor for detecting a position of a mobile body moving within a predetermined region, comprising: a base film composed of an industrial photographic film; a slit pattern formed on a surface of the base film; a reflecting film formed on the slit pattern through a lower anti-oxidizing protective layer; and an upper anti-oxidizing protective layer formed on the reflecting film so as to cover the reflecting film and the lower anti-oxidizing protective layer.

In the above photosensor scale, preferably, the lower anti-oxidizing protective layer is formed on edge portions of at least widthwise opposite sides of the base film.

BRIEF DESCRIPTION OF THE DRAWINGS

FIG. 9 shows steps of process for manufacturing the scale shown in FIG. 8;

DETAILED DESCRIPTION OF THE PREFERRED EMBODIMENTS

Figure 1:
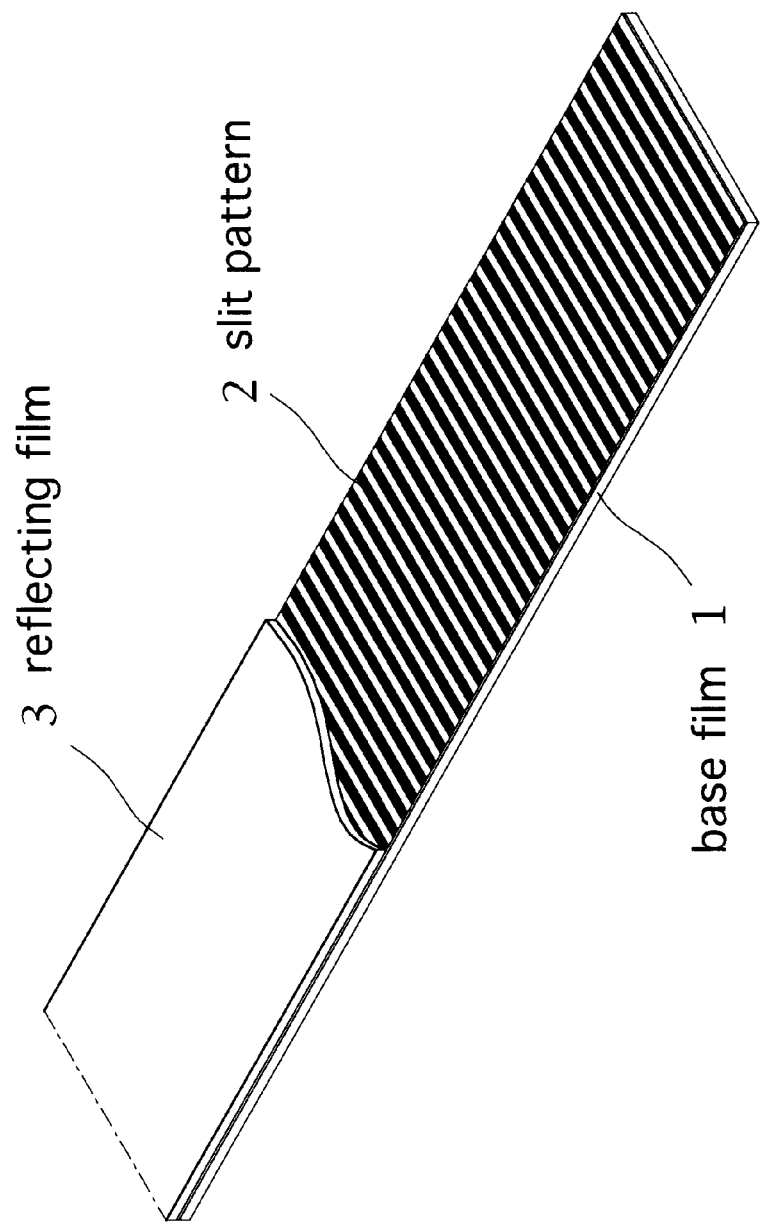
FIG. 1 is a partially cutaway perspective view of a photosensor scale according to the present invention.

FIG. 1 shows a photosensor scale. In this photosensor, a slit pattern 2 is formed on the surface of a base film 1 constituted by an industrial photographic film, and a reflecting film 3 is further formed on the slit pattern 2.

Figure 2:
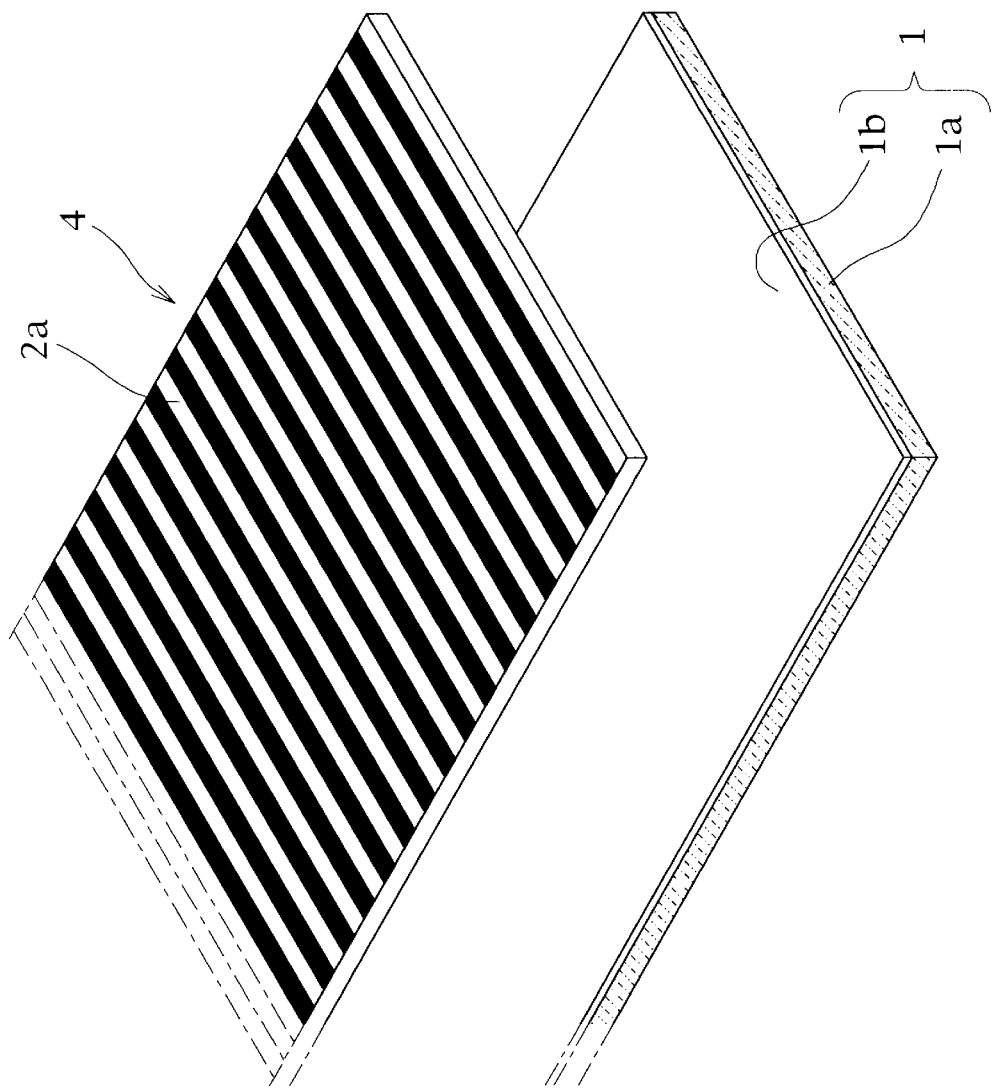
FIG. 2 is a perspective view illustrating a manufacturing state of the scale.

To manufacture the scale, as shown in FIG. 2, a pattern original sheet 4 is closely put on the surface of the base film 1, and exposed to light. Further, the exposed base film is then subjected to development to form the slit pattern 2 on the base film 1.

That is, the industrial photographic film is not limited to a negative film but it may be any film in which, as shown in FIG. 2, a photosensitive film 1b is formed on a synthetic resin film (usually polyethylene film) 1a. A positive film may be used. As for the pattern original sheet 4, slits may be formed in a metal sheet, a glass sheet, a film sheet, or the like. However, it is preferable to print the slit pattern 2 on a transparent sheet because the slit pattern 2 can be obtained with high precision and high accuracy by printing.

Next, the pattern original sheet 4 is brought into close contact with the surface of the base film 1, and exposed to light from above. Then, the exposed base film 1 is subjected to development. That is, the base film 1 is soaked in a developer, and subjected to fixing after the development is stopped. Then, the base film 1 is subjected to predetermined steps including water washing, drying, and so on, so that the exposed portions of the photosensitive film 1b become black or opaque, while the not-exposed portions of the same become transparent (reversely to this in the case of a positive film). As a result, the predetermined slit pattern 2 is formed on the base film 1 as shown in FIG. 1.

Figure 3:
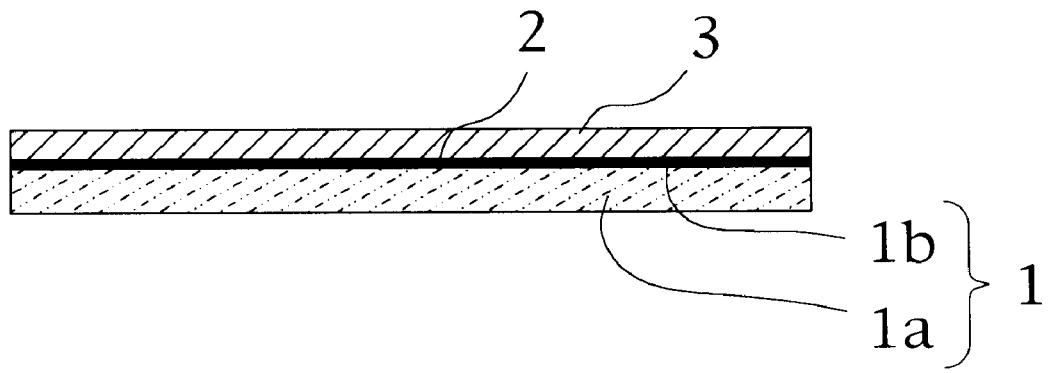
FIG. 3 is an enlarged widthwise sectional view of a base film provided with a slit pattern.

Further, the reflecting film 3 is formed on the slit pattern 2 of the base film 1 as shown in FIG. 3 so that light passed through a transparent portion of the slit pattern 2 is reflected by this reflecting film 3. Such a reflecting film 3 may be formed by vacuum deposition of aluminum, or by a known method such as ion-plating, sputtering, or the like.

According to the above-mentioned method, the slit pattern 2 can be formed much more minutely than that formed in a conventional metal plate.

Figure 4:
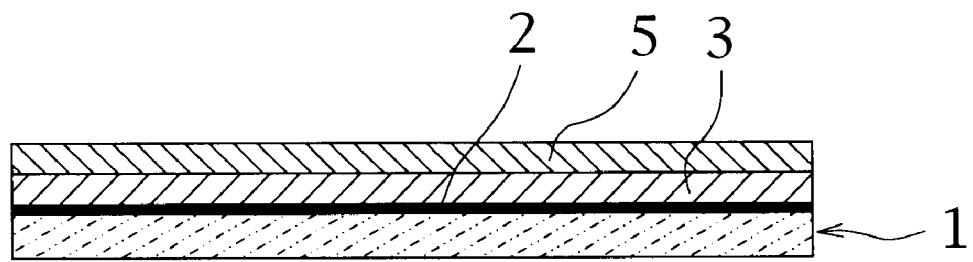
FIG. 4 is an enlarged widthwise sectional view of another embodiment if a photosensor scale.

However, the above-mentioned scale is apt to be oxidized because most part of the reflecting film 3 is in contact with the atmosphere. It is therefore preferable to cover the reflecting film 3 with an anti-oxidizing protective layer 5, as shown in FIG. 4, in order to prevent such oxidization. The anti-oxidizing protective layer 5 may be formed of water-resistant paint by application, spraying, printing, or the like.

Figure 5:
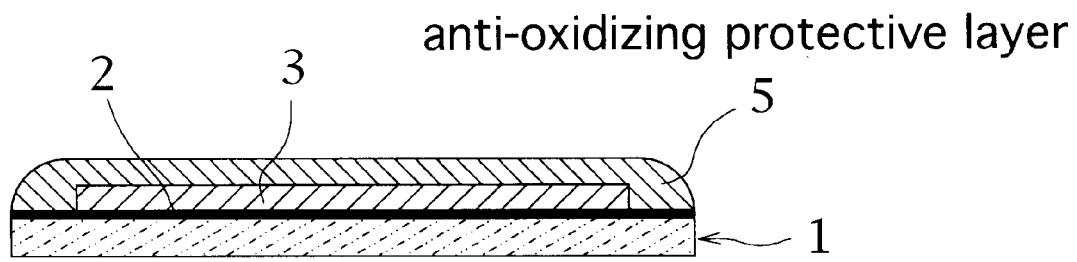
FIG. 5 is an enlarged widthwise sectional view of a further embodiment of photosensor scale.

As for the structure for protecting the reflecting film 3, it is preferable to cover not only the upper surface portion of the reflecting film 3 but also at least the widthwise opposite end sides of the reflecting film 3 with the anti-oxidizing protective layer 5, as shown in FIG. 5. Herein, the words "at least the widthwise opposite end sides" mean that it is a matter of course the lengthwise opposite end sides of the reflecting film 3 may be covered with the protective layer 5. This is because, not only the slit pattern 2 contains a kind of gelatin and therefore has hygroscopicity, but also the respective end surfaces of the slit pattern 2, the reflecting film 3 and the anti-oxidizing protective layer 5 are exposed to the outside air, so that in the above-mentioned structure, there is a fear that moisture or water makes an invasion from the end surfaces of the slit pattern 2, or between the reflecting film 3 and the anti-oxidizing protective layer 5, and the moisture or the water is apt to permeate, contact with, and oxidize the reflecting film 3. The oxidization of the reflecting film 3 advances from the outside toward the inside gradually to thereby make the reflecting performance of the reflecting film 3 worse, so that there is a fear that the accuracy in position detection is spoilt. If the upper surface and at least the widthwise opposite end side surfaces of the reflecting film 3 are covered with the anti-oxidizing protective layer 5, the reflecting film 3 is hardly oxidized. Even if the scale is used at a high-humidity place, the reflecting film 3 is not oxidized, and the durability of the scale is improved greatly. Further, it is preferable to make the distance between the widthwise side edge of the reflecting film 3 and the widthwise side edge of the base film 1 is made sufficiently large so that water can not permeate the inside of the slit pattern 2 from the end surfaces of the slit pattern 2.

Figure 6:
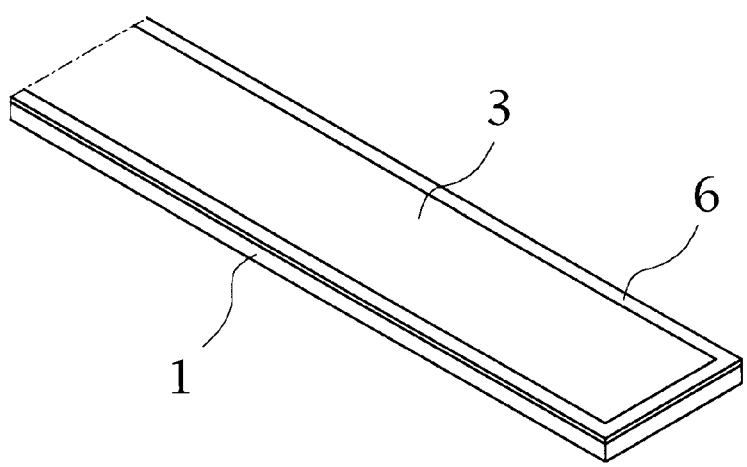
FIG. 6 is a perspective view illustrating a manufacturing mode of a part of reflecting film of the scale of FIG. 5.

In the case where not only the upper surface but also at least the widthwise opposite end side surfaces of the reflecting film 3 are covered with the anti-oxidizing protective layer 5, the reflecting film 3 is formed on the slit pattern 2 of the base film 1 such that the width of the reflecting film 3 is made narrower than the width of the base film 1. In this case, after the slit pattern 2 has been formed on the base film 1, a mask 6 is put at least on the widthwise opposite end side portions of the base film 1 so that the reflecting film 3 is formed inside a region surrounded by the mask 6, as shown in FIG. 6. Thereafter, the mask 6 is removed, and the anti-oxidizing protective layer is formed over the portion which is covered with the reflecting film 3 and the portion which had been covered with the mask 6, with water-resistant paint by application, spraying, printing, or the like.

Alternatively, the reflecting film 3 may be formed merely inside the region between the widthwise opposite sides of the base film 1.

Figure 7:
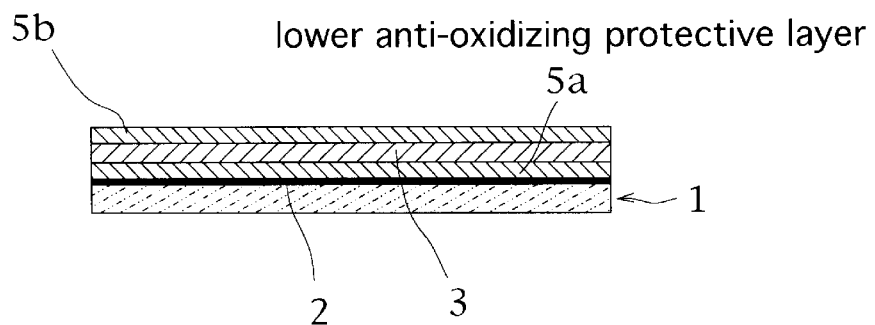
FIG. 7 is an enlarged widthwise sectional view of a still further embodiment of a photosensor scale.

Next, as for the structure for protecting the reflecting film 3, as shown in FIG. 7, the reflecting film 3 may be put between two anti-oxidizing protective layers 5a and 5b. That is, the slit pattern 2 is formed on the base film 1, the lower anti-oxidizing protective layer 5a is formed on the slit pattern 2, the reflecting film 3 is formed on the lower anti-oxidizing protective layer 5a, and then the upper anti-oxidizing protective layer 5b is further formed on the reflecting film 3. Not to say, the lower anti-oxidizing protective layer 5a is transparent.

Since both the upper and lower surfaces of the reflecting film 3 are protected by the anti-oxidizing protective layers 5a and 5b in the above-mentioned configuration, the reflecting film 3 can be more surely prevented from oxidization.

Figure 8:
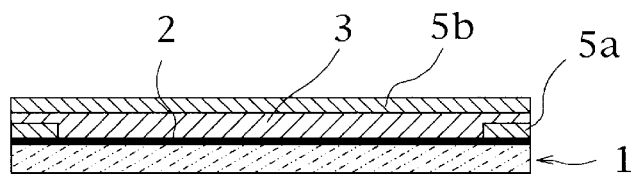
FIG. 8 is an enlarged widthwise sectional view of a modification of the scale of FIG. 7.

In the lower anti-oxidizing protective layer 5a, only the portions in the vicinity of the widthwise opposite end portions (if necessary in the lengthwise opposite end portions) of the anti-oxidizing protective layer 5a are necessarily used for the purpose of preventing the reflecting film 3 from oxidization. That is, the center portion of the layer 5a is useless. Therefore, the configuration may be modified as shown in FIG. 8. That is, a slit pattern 2 is formed on the surface of a base film 1, and a lower anti-oxidizing protective layer 5a is formed on the slit pattern 2 so as to cover only the widthwise opposite side edges of the slit pattern 2. A reflecting film 3 is formed on the slit pattern 2 and the lower anti-oxidizing protective layer 5a. Further, this reflecting film 3 is covered with an upper anti-oxidizing protective layer 5b. The material can be saved by omitting the center portion of the lower anti-oxidizing protective layer 5a.

The above-mentioned configuration can be obtained as follows. First, after the slit pattern 2 has been formed on the base film 1, the mask 6 is put on the center of the base film 1, and the lower anti-oxidizing protective layer 5a is formed on at least the widthwise opposite side edges of the base film 1 projecting over the mask 6, as shown in FIG. 9(a). Then, the mask 6 is removed, and the reflecting film 3 is formed on the slit pattern 2 and the lower anti-oxidizing protective layer 5a in the above-mentioned manner, as shown in FIG. 9(b). Further, the upper anti-oxidizing protective layer 5b is formed on the reflecting film 3, as shown in FIG. 9(c).

Figure 10:
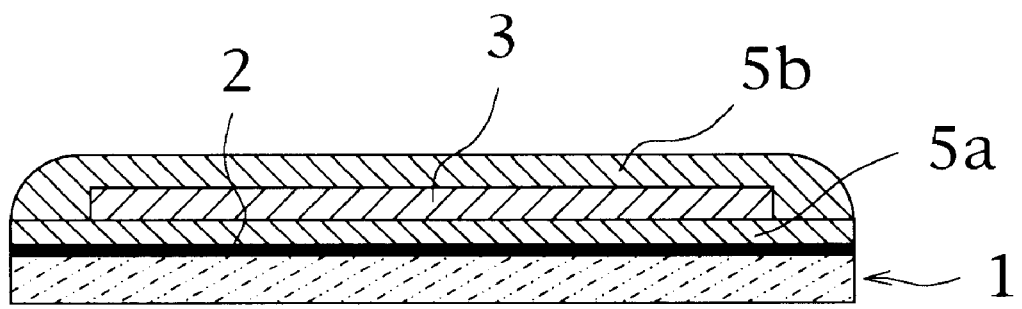
FIG. 10 is an enlarged widthwise sectional view of another modification of the scale of FIG. 7.
Figure 11:
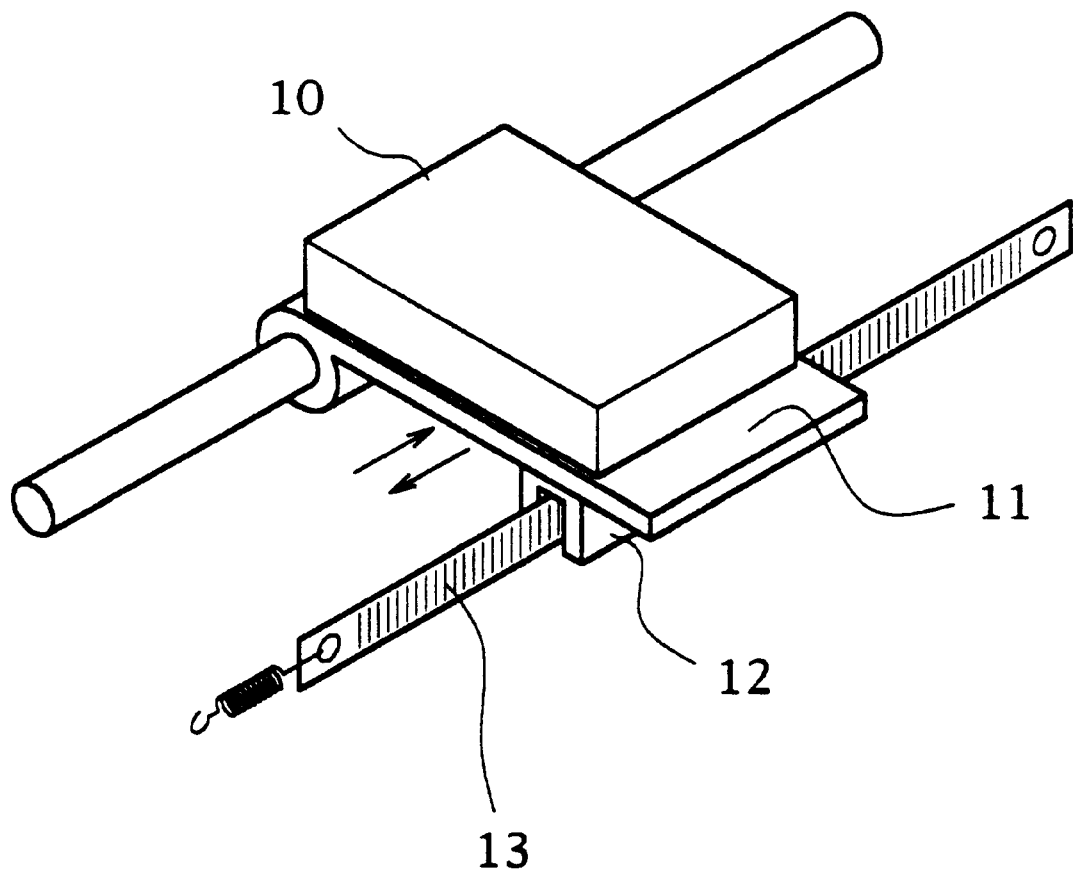
FIG. 11 is a perspective view of an attachment example of a conventional transmission-type photosensor.

Another embodiment in which double protective layers are provided is shown in FIG. 10. A slit pattern 2 is formed on a base film 1. A lower anti-oxidizing protective layer 5a is formed on the slit pattern 2. A reflecting film 3 which is narrower in width than the reflecting film 3 in the same manner as the above-mentioned embodiment shown in FIG. 5 is formed on the lower anti-oxidizing protective layer 5a, and an upper anti-oxidizing protective layer 5b is further formed on the reflecting film 3 and the lower anti-oxidizing protective layer 5a. If the whole surface of the reflecting film 3 is covered with the upper and lower anti-oxidizing protective layers 5b and 5a in such a manner, oxidization of the reflecting film 3 can be prevented more perfectly.

As has been described above in detail, according to the above-mentioned photosensor scale, the slit pattern 2 can be formed much more minutely than that formed on a conventional metal plate. Accordingly, it is possible to detect the position of an ink nozzle or the like with high precision, and it is therefore possible to perform accurate and fine printing.

In addition, by covering the reflecting film 3 with the anti-oxidizing protective layer 5 (5a and 5b), it is possible to prevent the reflecting film 3 from oxidization surely. Accordingly, there is no fear that the reflecting performance of the reflecting film 3 deteriorates to lose the accuracy of position detection. Therefore, the durability is superior.

Further, such a scale structured thus can be manufactured easily and on a large scale. It is therefore possible to reduce the cost of the scale per se on a large scale. In addition, the above-mentioned scale is used together with a reflex-type photosensor to constitute a position sensor. The reflex-type photosensor contains a built-in light source such as an LED or the like, and a detector (sensor) for receiving the reflected light of the light source. Therefore, only one photosensor is needed. Accordingly, it is possible to reduce also the cost of the position sensor as a whole.

What is claimed is:

1. A photosensor scale to be disposed in opposition to a reflex-type photosensor for detecting a position of a mobile body moving within a predetermined region;

said photosensor scale comprising: a base film composed of an industrial photographic film; a slit pattern formed on a surface of said base film; and a reflecting film formed on said slit pattern.

2. A photosensor scale according to claim 1, wherein said reflecting film is covered with an anti-oxidizing protective layer.

3. A photosensor scale to be disposed in opposition to a reflex-type photosensor for detecting a position of a mobile body moving within a predetermined region;

said photosensor scale comprising: a base film composed of an industrial photographic film; a slit pattern formed on a surface of said base film; a reflecting film formed on said slit pattern through a lower anti-oxidizing protective layer; and an upper anti-oxidizing protective layer formed on said reflecting film so as to cover said reflecting film and said lower anti-oxidizing protective layer.

4. A photosensor scale according to claim 3, wherein said lower anti-oxidizing protective layer is formed on edge portions of at least widthwise opposite sides of said base film.

* * * * *